F. BRINER.
STOCKLESS ANCHOR.
APPLICATION FILED OCT. 22, 1919.
1,335,816. Patented Apr. 6, 1920.
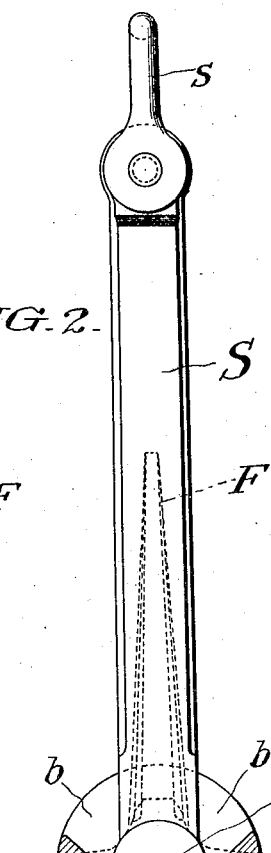
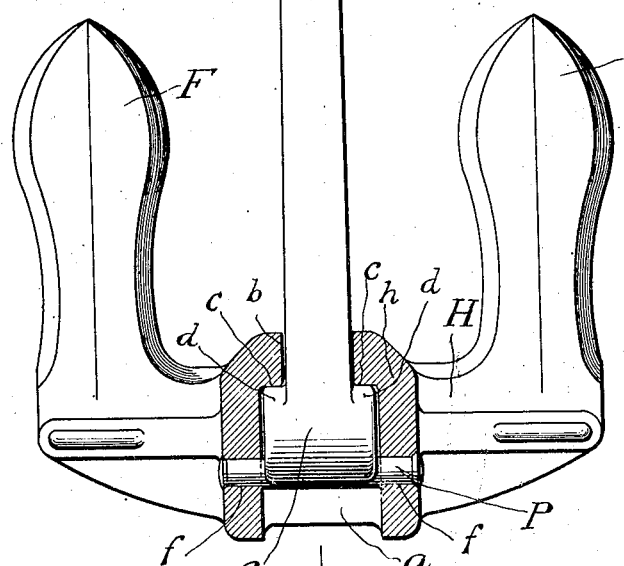
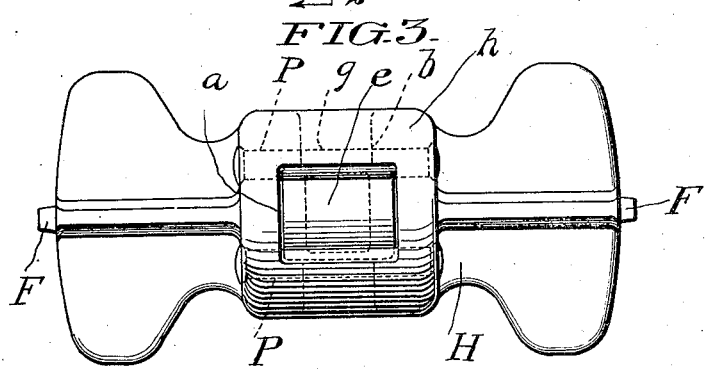
INVENTOR
Frank Briner
BY
Cornelius D. Ehret
his ATTORNEY

UNITED STATES PATENT OFFICE.

FRANK BRINER, OF CHESTER, PENNSYLVANIA, ASSIGNOR TO PENN SEABOARD STEEL CORPORATION, OF PHILADELPHIA, PENNSYLVANIA, A CORPORATION OF NEW YORK.

STOCKLESS ANCHOR.

1,335,816.      Specification of Letters Patent.      Patented Apr. 6, 1920.

Application filed October 22, 1919. Serial No. 332,541.

*To all whom it may concern:*

Be it known that I, FRANK BRINER, a citizen of the United States, residing in Chester, county of Delaware, State of Pennsylvania, have invented certain new and useful Improvements in Stockless Anchors, of which the following is a specification.

My invention resides in a stockless anchor in which the shank is provided at its one end with a head or enlargement forming extensions laterally of the shank as regards its plane of pivotal movement, the extensions having substantially cylindrical bearing surfaces bearing upon or coöperating with cylindrical bearing surfaces on the anchor head or fluke member.

My invention resides further in structure for retaining the shank head within a socket in the anchor head or fluke member for taking the shock and shear stresses, such structure comprising a pin or pins, or the like, extending transversely of the socket in the anchor head or fluke member and so disposed as to be for a part of the circumference thereof embedded or supported by the anchor head member and in part projecting into the socket below the shank head.

My invention resides in anchor structure of the character hereinafter described and claimed.

For an illustration of one of the forms my invention may take, reference is to be had to the accompanying drawing, in which:

Figure 1 is a vertical elevational view, partly in section of anchor structure embodying my invention.

Fig. 2 is a side elevational view, partly in section, on the line 2—2 of Fig. 1.

Fig. 3 is a bottom plan view of the structure illustrated in Fig. 1.

Referring to the drawing, H is the anchor head or fluke member integral with which are the flukes F. Midway between the flukes the head is provided with an enlargement or hub $h$ within which is formed the socket $a$ communicating with the transversely extending slot $b$ in which the shank S swings. The slot $b$ is narrower than the socket $a$, as viewed in Fig. 1, thereby forming bearing surfaces $c, c$, preferably portions of cylindrical surfaces, with which engage or upon which bear the lateral extensions or lugs $d$ on the shank head or enlargement $e$, which may be of generally cylindrical or any other suitable shape.

The anchor head or fluke member H may be of cast steel or other suitable material; and the shank S, provided with the usual separate pivoted shackle $s$, may be of case or other suitable material with the head $e$ formed integral therewith.

By the structure thus far described, the shank may swing to right or left, as viewed in Fig. 2, with respect to the anchor head H, the lower end of the shank S swinging through the transverse slot $b$ in the head or fluke member, the pivotal movement being afforded by the substantially cylindrical bearing surfaces $d$ upon the similar surfaces $c$ on the head or fluke member.

In assembling the anchor the shank S is passed upwardly through the socket $a$ and slot $b$ to position shown in Fig. 1.

Thereupon there is inserted one or more pins or rods P, P through holes $f, f$ in the hub $h$ and lying in substantially semi-circular grooves or slots $g$ in the walls $i, i$ of the cavity or socket $a$, whereby each pin P is supported throughout its entire circumference in each of the holes $f$, and through substantially half of the circumference in the grooves or slots $g$. The pins P are positioned, as indicated, below the shank head $e$, preventing it from dropping downwardly in the cavity or socket $a$.

By this structure it is apparent that neither of the pins extends across a free space in position where downward blow by the shank head would cause great stress. On the contrary, the disposition of the pins as indicated enables them to resist enormous shearing and other stresses without deformation or fracture.

What I claim is:

1. Anchor structure comprising a head having a socket formed therein, a shank movable with respect to said head, a head on said shank bearing upon said first named head within said socket, and means for retaining said shank in operative position comprising a pin in said first named head partially exposed in said socket and partially supported in a wall of said socket.

2. Anchor structure comprising a head having a socket formed therein, a shank movable with respect to said head, a head on said shank bearing upon said first named head within said socket, and means for retaining said shank in operative position comprising a pair of pins disposed on opposite sides of said socket beneath said shank head, and each exposed for a part of its circumference in said socket and for a part of its circumference supported in a groove in a wall of said socket.

3. Anchor structure comprising a head member having a socket therein, a transversely extending slot communicating with said socket, bearing surfaces in said socket, a shank extending through said slot, a head on said shank having bearing surfaces coacting with said first named bearing surfaces, and pins extending through said first named head member and lying in grooves in the walls of said socket for retaining said second named head within said socket.

In testimony whereof I have hereunto affixed my signature this 21st day of October, 1919.

FRANK BRINER.